(12) United States Patent
Joulin et al.

(10) Patent No.: US 11,090,980 B2
(45) Date of Patent: *Aug. 17, 2021

(54) TREAD FOR AN AIRCRAFT TIRE

(71) Applicant: COMPAGNIE GENERALE DES ETABLISSEMENTS MICHELIN, Clermont-Ferrand (FR)

(72) Inventors: Emmanuel Joulin, Clermont-Ferrand (FR); José-Carlos Araujo Da Silva, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 310 days.

This patent is subject to a terminal disclaimer.

(21) Appl. No.: 15/776,470

(22) PCT Filed: Nov. 18, 2016

(86) PCT No.: PCT/FR2016/053011
§ 371 (c)(1),
(2) Date: May 16, 2018

(87) PCT Pub. No.: WO2017/085423
PCT Pub. Date: May 26, 2017

(65) Prior Publication Data
US 2018/0326789 A1    Nov. 15, 2018

(30) Foreign Application Priority Data
Nov. 19, 2015    (FR) ...................................... 15/61131

(51) Int. Cl.
*B60C 11/00* (2006.01)
*B60C 1/00* (2006.01)
(Continued)

(52) U.S. Cl.
CPC ............ *B60C 11/0058* (2013.01); *B60C 1/00* (2013.01); *B60C 1/0016* (2013.01); *B60C 11/00* (2013.01);
(Continued)

(58) Field of Classification Search
CPC .................. B60C 11/0058; B60C 11/0066
See application file for complete search history.

(56) References Cited

U.S. PATENT DOCUMENTS 4,366,527 A    12/1982 Bell
4,463,120 A    7/1984 Collins et al.
(Continued)

FOREIGN PATENT DOCUMENTS

DE    3012148    10/1980
EP    0 864 447    9/1998
(Continued)

OTHER PUBLICATIONS

The Journal of the American Chemical Society, vol. 60, pp. 309, Feb. 1938.
(Continued)

*Primary Examiner* — Liam J Heincer
(74) *Attorney, Agent, or Firm* — Cozen O'Connor

(57) ABSTRACT

Airplane tire tread (2), having an axial width L, comprises a middle part (3) having an axial width $L_C$ at least equal to 50% and at most equal to 80% of L and composed of a middle rubber composition, and two lateral parts (41, 42), positioned axially on either side of the middle part (3), each having an axial width ($L_{S1}$, $L_{S2}$) between 10% and 25% of L and each composed of a lateral rubber composition. The middle rubber composition comprises at least 50 phr of a first diene elastomer, a reinforcing filler and a crosslinking system, which first diene elastomer comprises ethylene units and diene units comprising a carbon-carbon double bond, (Continued)

which units are distributed randomly within the first diene elastomer, the ethylene units representing at least 50 mol % of all the monomer units of the first diene elastomer.

22 Claims, 2 Drawing Sheets

(51) Int. Cl.
*C08K 3/04* (2006.01)
*C08L 9/00* (2006.01)
(52) U.S. Cl.
CPC ............ *B60C 11/0066* (2013.01); *C08K 3/04* (2013.01); *C08L 9/00* (2013.01); *B60C 2001/0083* (2013.01); *B60C 2011/0016* (2013.01); *B60C 2200/02* (2013.01); *C08L 2205/025* (2013.01)

(56) References Cited

U.S. PATENT DOCUMENTS

| | | | |
|---|---|---|---|
| 4,801,641 A | 1/1989 | Ogawa et al. | |
| 6,540,858 B1 | 4/2003 | Caretta et al. | |
| 7,547,654 B2 | 6/2009 | Boisson | |
| 8,071,800 B2 * | 12/2011 | Thuilliez | C07F 17/00 |
| | | | 556/7 |
| 9,919,565 B2 | 3/2018 | Bourgeois | |
| 10,189,978 B2 * | 1/2019 | Thuilliez | B60C 1/0016 |
| 10,414,132 B2 * | 9/2019 | Araujo Da Silva | B32B 7/12 |
| 2001/0047840 A1 * | 12/2001 | Nanni et al. | B60C 11/00 |
| | | | 152/209.16 |
| 2003/0079816 A1 * | 5/2003 | Mizuno | B60C 1/00 |
| | | | 152/209.5 |
| 2004/0072934 A1 | 4/2004 | O'Rourke et al. | |
| 2004/0112490 A1 | 6/2004 | Sandstrom | |
| 2004/0127616 A1 | 7/2004 | Wentworth | |
| 2005/0194076 A1 * | 9/2005 | Vermaat | B60C 9/2204 |
| | | | 152/209.6 |
| 2007/0017617 A1 * | 1/2007 | Lafrique | B60C 11/00 |
| | | | 152/209.5 |
| 2007/0137748 A1 | 6/2007 | Itai | |
| 2011/0146861 A1 | 6/2011 | Nanni et al. | |
| 2011/0214788 A1 | 9/2011 | Chambriard et al. | |
| 2011/0226401 A1 * | 9/2011 | Battocchio | G06K 19/07764 |
| | | | 152/548 |
| 2011/0265923 A1 * | 11/2011 | Arnold | C08L 7/00 |
| | | | 152/151 |
| 2012/0252929 A1 | 10/2012 | Yang | |
| 2012/0298271 A1 | 11/2012 | Bijaoui | |
| 2014/0083589 A1 * | 3/2014 | Abad | B60C 1/00 |
| | | | 152/526 |
| 2014/0194576 A1 | 7/2014 | Zhengzhe | |
| 2014/0326387 A1 | 11/2014 | Estenne et al. | |
| 2014/0343216 A1 * | 11/2014 | Custodero | C08L 7/00 |
| | | | 524/505 |
| 2015/0136287 A1 | 5/2015 | Bondu, Jr. et al. | |
| 2015/0353716 A1 * | 12/2015 | Thuilliez | C08L 9/06 |
| | | | 524/526 |
| 2017/0204260 A1 * | 7/2017 | Araujo Da Silva | C08L 23/16 |
| 2017/0326844 A1 | 11/2017 | Araujo Da Silva et al. | |
| 2018/0326788 A1 * | 11/2018 | Joulin | C08L 23/16 |
| 2018/0326790 A1 * | 11/2018 | Joulin | C08K 3/04 |
| 2018/0370289 A1 * | 12/2018 | Joulin | B60C 1/0016 |
| 2019/0061425 A1 * | 2/2019 | Broemmel | B60C 1/0016 |

FOREIGN PATENT DOCUMENTS

| | | | |
|---|---|---|---|
| EP | 1 092 731 | 4/2001 | |
| EP | 1 163 120 | 12/2001 | |
| EP | 1 381 525 | 1/2004 | |
| EP | 1 477 333 | 11/2004 | |
| EP | 1 554 321 | 7/2005 | |
| EP | 1 656 400 | 5/2006 | |
| EP | 1 800 905 | 6/2007 | |
| EP | 1 829 901 | 9/2007 | |
| EP | 1 954 705 | 8/2008 | |
| EP | 1 957 506 | 8/2008 | |
| EP | 2 310 213 | 4/2011 | |
| EP | 2 733 172 | 5/2014 | |
| FR | 1462227 | 7/1965 | |
| FR | 1461755 | 11/1965 | |
| FR | 1461754 | 2/1966 | |
| FR | 2 952 855 | 5/2011 | |
| FR | 2 983 121 | 5/2013 | |
| FR | 3 012 148 | 4/2015 | |
| WO | WO 2004/009693 | 1/2004 | |
| WO | WO 2010/000747 | 1/2010 | |
| WO | WO 2011/078859 | 6/2011 | |
| WO | WO-2014114607 A1 * | 7/2014 | B60C 1/0016 |
| WO | WO 2016/091571 | 6/2016 | |

OTHER PUBLICATIONS

S.K. Clark, "Touchdown dynamics", Precision Measurement Company, Ann Arbor, MI, NASA, Langley Research Center, Computational Modeling of Tires, pp. 9-19, Aug. 1995.

* cited by examiner

TREAD FOR AN AIRCRAFT TIRE

RELATED APPLICATIONS

This is a U.S. National Phase Application under 35 USC 371 of International Application PCT/FR2016/053011 filed on Nov. 18, 2016.

This application claims the priority of French application no. 1561131 filed Nov. 19, 2015, the entire content of which is hereby incorporated by reference.

FIELD OF THE INVENTION

The subject of the present invention is an aeroplane tire and, in particular, the tread of an aeroplane tire.

BACKGROUND OF THE INVENTION

An aeroplane tire is characterized by use at high pressure, load and speed. By way of example, an aeroplane tire of dimension 46×17R20, intended to be fitted to a commercial aeroplane, may be used at a pressure equal to 15.3 bar, a static load equal to 21 tonnes and a maximum speed equal to 360 km/h. Generally, an aeroplane tire is used at a pressure of greater than 9 bar and a degree of deflection at least equal to 32%. The working pressure is defined, for example, by the Tire and Rim Association (TRA) standard. The degree of deflection of a tire is, by definition, its radial deformation, or its variation in radial height, when the tire changes from an unladen inflated state to a statically loaded inflated state, under pressure and load conditions recommended, for example, by the TRA standard. It is expressed in the form of a relative deflection, defined by the ratio of this variation in radial height of the tire to half the difference between the outside diameter of the tire and the maximum diameter of the rim measured on the rim flange. The outside diameter of the tire is measured under static conditions in an unladen state inflated to the recommended pressure.

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The expressions "radially", "axially" and "circumferentially" mean "in the radial direction", "in the axial direction" and "in the circumferential direction", respectively.

The tread is the part of the tire intended to come into contact with the ground via a tread surface, and extending radially from a bottom surface to the tread surface, axially from a first tread edge to a second tread edge defining the axial width of the tread, and circumferentially over the whole periphery of the tire. Conventionally, the axial width of the tread is defined as the width of the patch of contact between the tread and the ground, measured along the axial straight line passing through the centre of the contact patch, when the new tire is subject to the loading and pressure conditions recommended by the TRA standard. The tread is generally composed of raised elements separated by voids. In the case of an aeroplane tire, the raised elements are usually circumferential ribs, continuous over the whole circumference of the tire, and separated by circumferential voids or grooves. The tread, which is the wearing part of the tire, comprises at least one rubber composition, usually based on natural rubber and on carbon black, these two main elements affording the rubber composition the mechanical properties necessary for the wear conditions of an aeroplane tire. In addition to these main elements, such a rubber composition conventionally comprises a vulcanization system and protective agents.

Radially inside the tread, a radial-type tire comprises a reinforcement, consisting of a crown reinforcement and a radial carcass reinforcement radially inside the crown reinforcement. The crown reinforcement comprises at least one crown layer composed of reinforcing elements or reinforcers coated with an elastomeric mixture and parallel to one another. The radial carcass reinforcement comprises at least one carcass layer composed of reinforcers coated with an elastomeric mixture, parallel to one another and oriented substantially radially, that is to say forming, with the circumferential direction, an angle of between 85° and 95°. The reinforcers of the crown and carcass layers, for aeroplane tires, are usually textile reinforcers made of aliphatic polyamide such as nylon, made of aromatic polyamide such as aramid, or made of hybrid material combining, for example, an aliphatic polyamide and an aromatic polyamide.

In aeroplane tires, the presence of non-uniform wear to the tread has been observed, known as irregular wear, resulting from the stresses that occur during the various life stages of the tire: take-off, taxiing and landing. Differential wear to the tread between a middle part and the two lateral parts of the tread, axially on the outside of the middle part, has more particularly been observed, with the wear to this middle part being greater. The differential wear to the middle part of the tread leads to a limiting of the service life of the tire, and therefore to a limiting of its use and the premature removal thereof, despite the fact that the tread generally only has relatively small wear to the lateral parts of the tread: this is economically unsound.

Those skilled in the art have demonstrated two types of wear, depending on the life stage of the tire. On landing, the middle part of the tread, having an axial width at least equal to 50% and at most equal to 80% of the total axial width of the tread, and coming into contact with the ground, is subject to wear referred to as "touch wear", resulting from significant thermal heating at the moment at which the tread surface enters into contact with the ground, due to the speed differential between the speed of rotation of the tire and the speed of the aeroplane. In the taxiing phase, before take-off or after landing, the lateral parts of the tread, positioned axially on either side of the middle part and each having an axial width at least equal to 10% and at most equal to 25% of the total axial width of the tread, are subject to wear referred to as "taxiing wear", resulting from the braking forces exerted on these lateral parts due to their speed of rotation, which is higher than that of the middle part. Thus, the tread is mainly worn in its middle part on landing and in its lateral parts on taxiing.

In order to solve the problem of irregular wear specific to aeroplane tires, those skilled in the art sought, according to a first approach, to optimize the inflated meridian profile of the tread surface, this meridian profile being the meridian cross section through the tread surface of an unladen new tire inflated to its nominal pressure, without taking into account circumferential grooves. optimizing this inflated meridian profile, i.e. the geometric form thereof, makes it possible to optimize the geometric form of the contact surface of the tire with the ground and, consequently, to distribute mechanical stresses within this contact surface and hence to act on the wear of the tread. For example, documents EP 1163120, EP 1381525, EP 1477333 and EP 2310213 describe solutions aiming to optimize the inflated profile of the tread surface by acting on the tensile stiffnesses of the crown and/or carcass layers, or on the tensile stiffness differentials between the middle part and the lateral parts of the crown layers, or else on an optimized crown layer profile with a concave middle part. All these solutions are based on changes in the material and/or geometry of the crown layers.

Another approach to the wear of an aeroplane tire is that of optimizing the rubber composition(s) composing the tread. Indeed, wear also depends on the rubber composition(s) composing the tread and on their sensitivity to abrasion, characterized in particular by their cohesion, since cohesion depends on the chemical composition.

SUMMARY OF THE INVENTION

One object of the present invention, in relation to an aeroplane tire of the prior art, is to increase the resistance to touch wear of the middle part of the tread during landing phases, while still maintaining the same level of resistance to taxiing wear of the lateral parts of the tread during taxiing phases, by acting on the rubber composition(s) of the various parts of the tread.

This object has been achieved, according to one aspect of the invention, by an aeroplane tire, comprising a tread having an axial width L, the tread comprising:

a middle part having an axial width $L_C$ at least equal to 50% and at most equal to 80% of the axial width L of the tread and composed of a middle rubber composition, and two lateral parts positioned axially on either side of the middle part, each having an axial width at least equal to 10% and at most equal to 25% of the axial width L of the tread and each composed of a lateral rubber composition, the middle rubber composition comprising at least one first diene elastomer, a reinforcing filler and a cross-linking system, which first diene elastomer comprises ethylene units and diene units comprising a carbon-carbon double bond, which units are distributed randomly within the first diene elastomer, the ethylene units representing at least 50 mol % of all the monomer units of the first diene elastomer.

It should be noted that the lateral parts of the tread may have different axial widths and/or have different lateral rubber compositions, even though, preferentially, the axial widths of the lateral parts are identical and though their lateral rubber compositions are also identical.

A content by weight or content of a first diene elastomer at least equal to 50 phr (50 parts per hundred parts of elastomer) means that this first diene elastomer is the predominant elastomer in the middle rubber composition. This predominant diene elastomer content provides a large contribution to the touch wear resistance of the middle part of the tread.

Preferentially, the middle rubber composition comprises at least 60 phr of a first middle part diene elastomer.

According to a first embodiment, the first diene elastomer is a copolymer comprising ethylene units, butadiene units and units of cyclical structure selected from the subunits of formula UD and of formula UE,

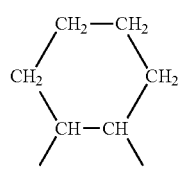
UD

-continued

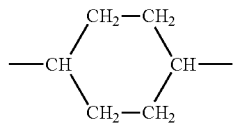
UE

Whereas the subunit of the unit UD forms a divalent hydrocarbon-based ring comprising 6 carbon atoms of 1,2-cyclohexane type, the subunit of the unit UE forms a divalent hydrocarbon-based ring comprising 6 carbon atoms of 1,4-cyclohexane type.

According to a preferential embodiment of the invention, the first diene elastomer is a copolymer comprising the following units UA, UB, UC, UD, UE and UF, distributed randomly within the copolymer chain,

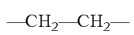  UA)

according to a molar percentage of m %

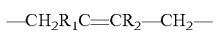  UB)

according to a molar percentage of n %

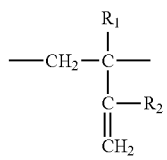  UC)

according to a molar percentage of o %

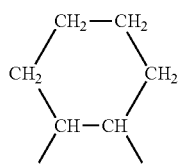  UD)

according to a molar percentage of p %

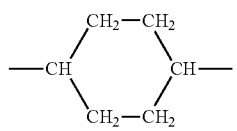  UE)

according to a molar percentage of q %

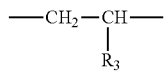  UF)

according to a molar percentage of r %

$R_1$ and $R_2$, which are identical or different, denoting a hydrogen atom, a methyl radical or a phenyl radical which is unsubstituted or substituted in the ortho, meta or para position by a methyl radical, R$_3$ denoting an alkyl radical having from 1 to 4 carbon atoms or an aryl radical, m, n, o, p, q and r being numbers ranging from 0 to 100, m≥50

0<o+p≤25 o+p+q≥10 n+o>0 q≥0

0≥r≤25 the respective molar percentages of m, n, o, p, q and r being calculated on the basis of the sum of m+n+o+p+q+r, which is equal to 100.

It is understood that the first diene elastomer may be composed of a mixture of elastomers which contain the units UA, UB, UC, UD, UE and UF according to the respective molar percentages m, n, o, p, q and r as defined above and which differ from one another in their macrostructure or their microstructure, in particular in the respective molar contents of the units UA, UB, UC, UD, UE and UF.

r is preferentially equal to 0, that is to say that the first diene elastomer does not contain any UF units.

According to a particular embodiment, at least one of the two molar percentages p and q is different from 0. In other words, the first diene elastomer preferably contains at least one of the subunits which are a divalent hydrocarbon-based ring containing 6 carbon atoms of 1,2-cyclohexane type and a divalent hydrocarbon-based ring containing 6 carbon atoms of 1,4-cyclohexane type.

More preferentially, p is strictly greater than 0.

According to one embodiment of the invention, the first diene elastomer meets at least one of the following criteria, and more preferably all of the following criteria:

m≥65 n+o+p+q≥15, more preferably still 20

10≥p+q≥2

1≥n/(o+p+q)

when q is non-zero, 20≥p/q≥1.

According to another preferential embodiment of the invention, the first diene elastomer contains, as monomer units, solely the units UA, UB, UC, UD and UE according to their respective molar percentages m, n, o, p and q, preferably all different from 0.

According to another preferential embodiment of the invention, the first diene elastomer contains, as monomer units, solely the units UA, UB, UC and UD according to their respective molar percentages m, n, o and p, preferably all different from 0.

According to another preferential embodiment of the invention, R$_1$ and R$_2$ are identical and denote a hydrogen atom.

According to any one of the embodiments of the invention, the first diene elastomer preferably has a number-average molar mass (Mn) of at least 60 000 g/mol and of at most 1 500 000 g/mol.

The first diene elastomer may be obtained according to different methods of synthesis known to those skilled in the art, especially as a function of the targeted values of m, n, o, p, q and r. Generally, the first diene elastomer may be prepared by copolymerization of at least one conjugated diene monomer and of ethylene and according to known methods of synthesis, in particular in the presence of a catalytic system comprising a metallocene complex. In this respect, mention may be made of the catalytic systems based on metallocene complexes, which catalytic systems are described in the documents EP 1 092 731 A1, EP 1 554 321 A1, EP 1 656 400 A1, EP 1 829 901 A1, EP 1 954 705 A1 and EP 1 957 506 A1 in the name of the Applicants.

A conjugated diene having from 4 to 12 carbon atoms is especially suitable as conjugated diene monomer. Mention may be made of 1,3-butadiene, 2-methyl-1,3-butadiene, 2,3-dimethyl-1,3-butadiene, an aryl-1,3-butadiene or 1,3-pentadiene. According to a preferential aspect, the diene monomer is 1,3-butadiene or 2-methyl-1,3-butadiene, more preferentially 1,3-butadiene, in which case R$_1$ and R$_2$ each represent a hydrogen.

Thus, according to some of these methods of synthesis, the first diene elastomer may be obtained by copolymerization of at least one conjugated diene monomer and of ethylene, in the presence of a catalytic system comprising a lanthanide metallocene complex with ansa ligands of fluorenyl type. In this respect, mention may be made of the metallocene complexes described in the documents EP 1 092 731 A1, EP 1 554 321 A1 and EP 1 954 705 A1.

The first diene elastomer which contains UF units according to a particular embodiment of the invention may be obtained by copolymerization of at least one conjugated diene monomer and of two olefins, such as ethylene and an α-olefin, in the presence of a catalytic system comprising a lanthanide metallocene complex with ligands of ansa cyclopentadienyl-fluorenyl type. For example, an α-olefin having from 3 to 18 carbon atoms, advantageously having from 3 to 6 carbon atoms, is suitable as α-olefin monomer. Mention may be made of propylene, butene, pentene, hexene or a mixture of these compounds. Mention may also be made, as termonomer used in combination with at least one conjugated diene monomer and ethylene, of a styrene derivative. The catalytic systems based on metallocene complexes may be those described in the documents EP 1 092 731 A1, EP 1 656 400 A1, EP 1 829 901 A1 and EP 1 957 506 A1 in the name of the Applicants.

The first diene elastomer may be prepared in accordance with the abovementioned documents by adjusting the polymerization conditions by means known to those skilled in the art, so as to achieve number-average molar mass (Mn) values of at least 60 000 g/mol. By way of illustration, the polymerization time may be significantly increased so that the monomer conversion is greater, thereby leading to molar masses of at least 60 000 g/mol being obtained. By way of illustration, during the preparation of the catalytic systems according to the abovementioned documents, the stoichiometry of the alkylating agent relative to the metallocene complex(es) is reduced, so as to reduce chain transfer reactions and to make it possible to obtain molar masses of at least 60 000 g/mol.

According to a first variant of the invention, the middle rubber composition comprises a second elastomer, preferably a diene elastomer, that is to say an elastomer comprising diene monomer units. According to any one of the embodiments of the first variant of the invention, the content of the second elastomer is preferably less than 50 phr.

The second elastomer of the middle rubber composition may be an "essentially unsaturated" or "essentially saturated" diene elastomer. "Essentially unsaturated" is understood to mean generally a diene elastomer resulting at least in part from conjugated diene monomers having a content of subunits or units of diene origin (conjugated dienes) which is greater than 15% (mol %), which units of diene origin comprise a carbon-carbon double bond; thus, diene elastomers such as butyl rubbers or copolymers of dienes and α-olefins of EPDM type do not fall under the preceding definition and may especially be described as "essentially saturated" diene elastomers (low or very low content, always less than 15%, of subunits of diene origin). In the category of "essentially unsaturated" diene elastomers, "highly unsaturated" diene elastomer is understood in particular to mean a diene elastomer having a content of subunits of diene origin (conjugated dienes) which is greater than 50%.

Given these definitions, the second diene elastomer capable of being used in the compositions in accordance with the invention can be:

(a)—any homopolymer of a conjugated diene monomer, especially any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene.

According to one embodiment, the second elastomer is a highly unsaturated diene elastomer selected from the group consisting of polybutadienes, polyisoprenes, butadiene copolymers, isoprene copolymers and the mixtures of these elastomers.

According to another embodiment, the second elastomer is a ternary copolymer obtained by copolymerization of ethylene and of an α-olefin having from 3 to 6 carbon atoms with a non-conjugated diene monomer having from 6 to 12 carbon atoms.

According to a second variant of the invention, the first diene elastomer is the only elastomer of the middle rubber composition.

The reinforcing filler, known for its abilities to reinforce a rubber composition which can be used for the manufacture of tires, can be a carbon black, a reinforcing inorganic filler, such as silica, with which is combined, in a known way, a coupling agent, or a mixture of these two types of filler. Such a reinforcing filler typically consists of nanoparticles, the (weight-)average size of which is less than a micrometre, generally less than 500 nm, most commonly between 20 and 200 nm, in particular and more preferentially between 20 and 150 nm.

Advantageously, the reinforcing filler of the middle rubber composition comprises a carbon black.

The carbon black exhibits a BET specific surface area preferably of at least 90 m$^2$/g, more preferentially of at least 100 m$^2$/g. The blacks conventionally used in tires or their treads ("tire-grade" blacks) are suitable for this purpose. Mention will more particularly be made, among the latter, of the reinforcing carbon blacks of the 100, 200 or 300 series (ASTM grade), such as, for example, the N115, N134, N234 or N375 blacks. The carbon blacks can be used in the isolated state, as available commercially, or in any other form, for example as support for some of the rubber additives used. The BET specific surface area of the carbon blacks is measured according to Standard D6556-10 [multipoint (at least 5 points) method—gas: nitrogen—relative pressure P/P0 range: 0.1 to 0.3].

According to a particular embodiment of the invention, the reinforcing filler of the middle rubber composition comprises 100% by weight of a carbon black.

According to another embodiment of the invention, the reinforcing filler of the middle rubber compositions comprises an inorganic filler, preferably a silica.

The term "reinforcing inorganic filler" is intended to mean any inorganic or mineral filler, regardless of its colour and its origin (natural or synthetic), also referred to as "white" filler, "clear" filler or even "non-black" filler, in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferentially silica ($SiO_2$), are especially suitable as reinforcing inorganic fillers. The silica used may be any reinforcing silica known to those skilled in the art, especially any precipitated or fumed silica exhibiting a BET surface area and a CTAB specific surface area both of less than 450 m$^2$/g, preferably from 30 to 400 m$^2$/g and especially between 60 and 300 m$^2$/g.

The physical state in which the reinforcing inorganic filler is provided is unimportant, whether it is in the form of a powder, microbeads, granules or else beads. Of course, the term "reinforcing inorganic filler" is also intended to mean mixtures of various reinforcing inorganic fillers, in particular of highly dispersible silicas as described above.

In the present account, as regards the silica, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface area is the external surface determined according to French Standard NF T 45-007 of November 1987 (method B).

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Advantageously, the content of reinforcing filler of the middle rubber composition is at least equal to 20 phr and at most equal to 70 phr, preferably at least equal to 25 phr and at most equal to 50 phr.

In particular, a content of reinforcing filler of the middle rubber composition preferentially at least equal to 25 phr and at most equal to 50 phr makes it possible to improve the resistance to touch wear during landings, without degrading the resistance to taxiing wear during taxiing phases.

The crosslinking system can be based either, on the one hand, on sulfur or, on the other hand, on sulfur donors and/or on peroxide and/or on bismaleimides. The crosslinking system is preferentially a vulcanization system, i.e. a system based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), or else known vulcanization retarders, which are incorporated during the first non-productive phase and/or during the productive phase, as described subsequently.

The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

The middle rubber composition may also comprise all or a portion of the usual additives customarily used in elastomer compositions intended to constitute treads, such as, for example, plasticizers, pigments, protective agents, such as antiozone waxes, chemical antiozonants or antioxidants, or antifatigue agents.

Advantageously, the middle rubber composition comprises 0 to 20 phr of a liquid plasticizer.

A plasticizer is regarded as being liquid when, at 23° C., it has the ability to eventually assume the shape of its container, this definition being given in contrast to plasticizing resins, which are by nature solids at ambient temperature. Mention may be made, as liquid plasticizer, of vegetable oils, mineral oils, ether, ester, phosphate or sulfonate plasticizers, and their mixtures.

Preferentially, the content of liquid plasticizer of the middle rubber composition is equal to 0.

At least one lateral rubber composition is advantageously different from the middle rubber composition.

According to a first embodiment, at least one lateral rubber composition advantageously comprises a diene elastomer, a reinforcing filler and a crosslinking system, which diene elastomer is a highly unsaturated diene elastomer selected from the group consisting of polybutadienes, polyisoprenes, butadiene copolymers, isoprene copolymers and mixtures of these elastomers.

This first embodiment of the lateral rubber composition is identical to the rubber composition of a tread of the prior art and therefore guarantees a level of resistance to taxiing wear of the lateral parts of the tread which is identical to that of the prior art taken as reference.

According to a second embodiment, at least one lateral rubber composition advantageously comprises at most 50 phr of the first diene elastomer according to any one of the embodiments of the first diene elastomer which are described above. The diene elastomer of a lateral rubber composition may or may not be identical to the first diene elastomer of the middle rubber composition.

This second embodiment of the lateral rubber composition guarantees a level of resistance to taxiing wear of the lateral parts of the tread which is close to that of the prior art taken as reference.

Usually, the two lateral parts, positioned axially on either side of the middle part, have identical axial widths. Advantageously, the two lateral parts are composed of identical lateral rubber compositions. According to a preferred embodiment, the two lateral parts, positioned axially on either side of the middle part, have identical axial widths and are composed of identical lateral rubber compositions.

the tire comprises a crown reinforcement radially inside the tread, the tire advantageously comprises an interlayer composed of a rubber composition, in contact by a radially outer face with at least the middle part of the tread and by a radially inner face with the crown reinforcement. Contact of the radially outer face of the interlayer with at least the middle part of the tread means that the axial width of this contact is at least equal to the axial width $L_C$ of the middle part of the tread. Contact of the radially inner face of the interlayer with the crown reinforcement is contact with the protective reinforcement, which is the radially outermost part of the crown reinforcement, intended to protect the working reinforcement, which is the radially innermost part of the crown reinforcement. This interlayer, also referred to as connecting layer, guarantees better connection between the tread comprising a rubber composition according to the invention and the crown reinforcement.

According to a first embodiment, the interlayer is composed of a rubber composition comprising natural rubber. The rubber composition also comprises a reinforcing filler and a crosslinking system.

According to a second embodiment, the interlayer is composed of a rubber composition comprising an elastomer comprising ethylene units and diene units comprising a carbon-carbon double bond, which units are distributed randomly within the elastomer. The rubber composition also comprises a reinforcing filler and a crosslinking system. The rubber composition of the interlayer, according to this third embodiment, may be used in its generic form, as described above, or in the form of any one of its embodiments, described in document FR 14/61755.

According to a third embodiment, the interlayer is composed of an elastomeric laminate comprising, radially from the outside to the inside, n layers Ci, n being an integer greater than or equal to 2 and i being an integer ranging from 1 to n, each composed of a diene rubber composition, the layer C1 comprising a diene elastomer E comprising ethylene units and diene units, the diene units representing more than 10% by weight of the monomer units of the diene elastomer E, the layer Cn comprising from 50 to less than 100 phr of a diene elastomer N having a content by weight of diene units of greater than 50%, the content expressed in phr of diene elastomer N being higher in the layer Cn than in the layer C1, the content expressed in phr of diene elastomer E being higher in the layer C1 than in the layer Cn, the layers Ci, for the values of i ranging from 2 to n−1, where n is greater than 2, comprising a diene elastomer I selected from the group consisting of diene homopolymers and copolymers having more than 10% by weight of diene units. The rubber compositions also comprise a reinforcing filler and a crosslinking system. The rubber compositions of the interlayer, according to this fourth embodiment, may be used in their generic forms, as described above, or in the form of any one of their respective embodiments, described in document FR 14/62227.

Regarding the composition of the elastomers, the microstructure is generally determined by $^1$H NMR analysis, supplemented by $^{13}$C NMR analysis when the resolution of the $^1$H NMR spectra does not enable the attribution and quantification of all the species. The measurements are carried out using a Bruker 500 MHz NMR spectrometer at frequencies of 500.43 MHz for observing protons and 125.83 MHz for observing carbons. For the measurements of mixtures or elastomers which are insoluble but which have the ability to swell in a solvent, an HRMAS z-grad 4 mm probe is used, making it possible to observe protons and carbons in proton-decoupled mode. The spectra are acquired at spin speeds of 4000 Hz to 5000 Hz. For the measurements of soluble elastomers, a liquid NMR probe is used, making it possible to observe protons and carbons in proton-decoupled mode. The insoluble samples are prepared in rotors filled with the analyte and a deuterated solvent enabling swelling, in general deuterated chloroform ($CDCl_3$). The solvent used must always be deuterated and its chemical nature may be adapted by those skilled in the art. The amounts of material used are adjusted so as to obtain spectra with sufficient sensitivity and resolution. The soluble samples are dissolved in a deuterated solvent (approximately 25 mg of elastomer in 1 ml), in general deuterated chloroform ($CDCl_3$). The solvent or solvent blend used must always be deuterated and its chemical nature may be adapted by those skilled in the art. The sequences used for proton NMR and carbon NMR, respectively, are identical for a soluble sample and for a swelled sample. For the proton NMR, a simple 30° pulse sequence is used. The spectral window is adjusted to observe all the resonance lines belonging to the molecules analysed. The accumulation number is adjusted in order to obtain a signal to noise ratio that is sufficient for the quantification of each subunit. The recycle period between each pulse is adapted to obtain a quantitative measurement. For the carbon NMR, a simple 30° pulse sequence is used with proton decoupling only during acquisition to avoid the "nuclear Overhauser" effects (NOE) and to remain quantitative. The spectral window is adjusted to observe all the resonance lines belonging to the molecules analysed. The accumulation number is adjusted in order to obtain a signal to noise ratio that is sufficient for the quantification of each subunit. The recycle period between each pulse is adapted to obtain a quantitative measurement. The NMR measurements are carried out at 25° C.

BRIEF DESCRIPTION OF THE DRAWINGS

The characteristics of the invention will be better understood by means of FIGS. 1 and 2, of results of measurements and tests carried out on rubber compositions as used in a tire according to the invention.

DETAILED DESCRIPTION OF THE DRAWINGS

Figure 1:
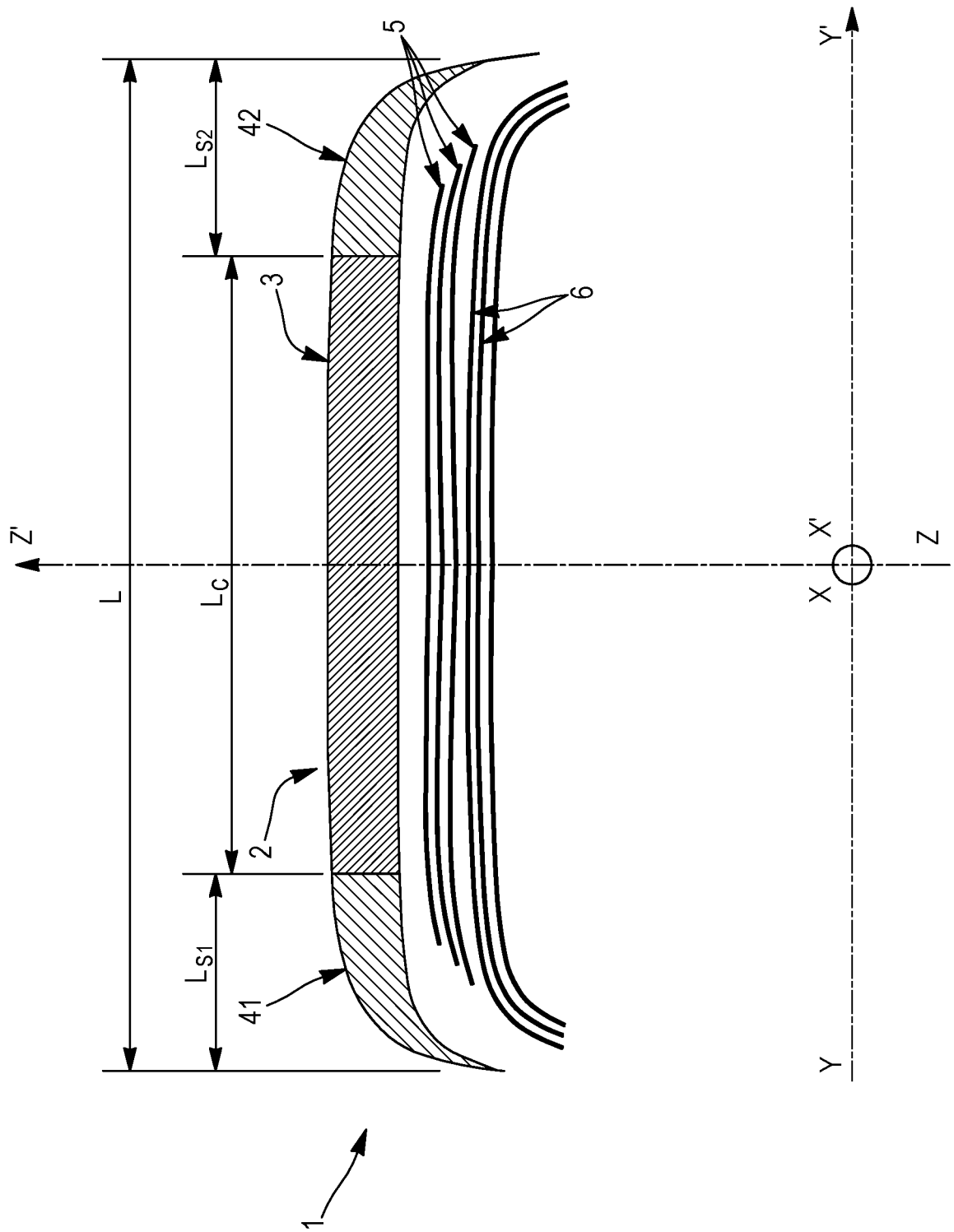
FIG. 1 shows a view in cross-section in a meridian plane of the crown of an airplane tire according to an embodiment of the invention.

FIG. 1, not shown to scale in order to facilitate the understanding thereof, presents a view in cross section in a meridian plane of the crown of an aeroplane tire according to the invention, comprising, radially from the outside to the inside, a tread 2, a crown reinforcement 5 and a carcass reinforcement 6. The tread 2, having an axial width L, comprises a middle part 3 having an axial width $L_C$ at least equal to 50% and at most equal to 80% of the axial width L of the tread and composed of a middle rubber composition, and two lateral parts (41, 42), positioned axially on either side of the middle part 3, each having an axial width ($L_{S1}$, $L_{S2}$) at least equal to 10% and at most equal to 25% of the axial width L of the tread and each composed of a lateral rubber composition.

Figure 2:
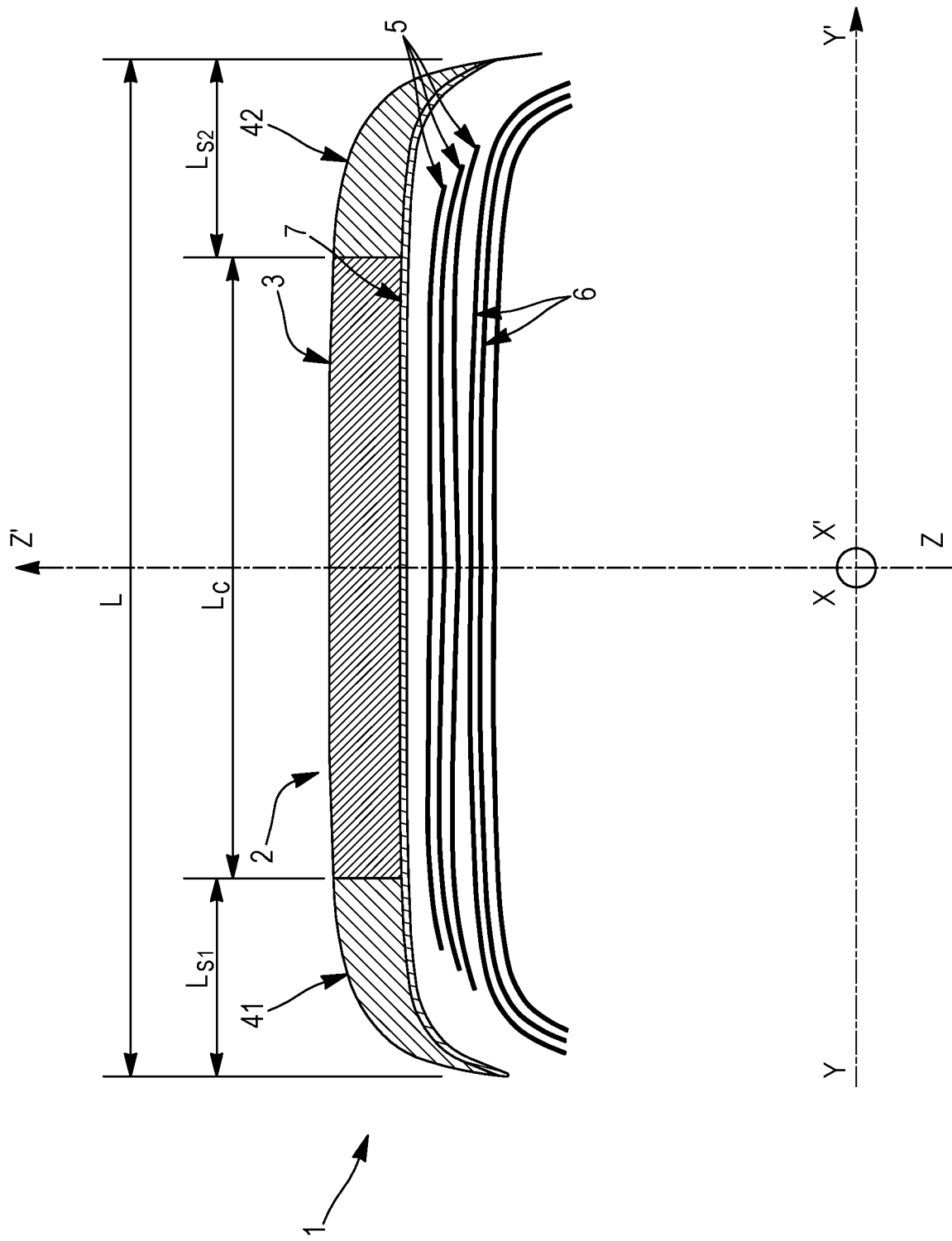
FIG. 2 shows a view in cross-section in a meridian plane of the crown of an airplane tire according to another embodiment of the invention.

FIG. 2 presents a view in cross section in a meridian plane of the crown of an aeroplane tire according to a particular embodiment of the invention, wherein the tire 1 also comprises an interlayer 7 composed of a rubber composition, in contact by a radially outer face with the tread 2 and by a radially inner face with the crown reinforcement 5.

The invention has more particularly been studied in the case of an aeroplane tire of dimension 46×17R20, intended to be fitted to the main landing gear of a commercial airliner. For such a tire, the inflation pressure is 15.3 bar, the static load is 21 tonnes and the maximum speed is 360 km/h.

Laboratory tests and measurements were carried out on different rubber compositions comprising a first diene elastomer, a reinforcing filler and a crosslinking system, which first diene elastomer comprises ethylene units and diene units comprising a carbon-carbon double bond, which units are distributed randomly within the first diene elastomer, the ethylene units representing at least 50 mol % of all the monomer units of the first diene elastomer.

The rubber compositions according to the invention and of the prior art were prepared according to the process described below. The diene elastomers, the reinforcing fillers and also the various other ingredients, with the exception of the vulcanization system, are successively introduced into an internal mixer (final degree of filling: approximately 70% by volume), the initial vessel temperature of which is approximately 80° C. Thermomechanical working (nonproductive phase) is then carried out in one step, which lasts in total approximately 3 to 4 min, until a maximum "dropping" temperature of 165° C. is reached. The mixture thus obtained is recovered and cooled and then sulfur and an accelerator of sulfamide type are incorporated on a mixer (homofinisher) at 70° C., everything being mixed (productive phase) for an appropriate time (for example approximately ten minutes). The compositions thus obtained are subsequently calendered, either in the form of slabs (thickness of 2 to 3 mm) or of thin sheets of rubber, for the measurement of their physical or mechanical properties, or extruded in the form of an aeroplane tire tread.

The wear resistance of the rubber compositions defined above was evaluated on samples, in particular by a high-speed abrasion test, representative of the landing conditions of an aeroplane tire, combined with a measurement of loss in weight and by a measurement of breaking strength.

Regarding the loss in weight, a sample of rubber composition is subjected to an abrasion test on a high-speed abrasion tester. The high-speed abrasion test is carried out according to the principle described in the paper by S. K. Clark, "*Touchdown dynamics*", Precision Measurement Company, Ann Arbor, Mich., NASA, Langley Research Center, *Computational Modeling of Tires*, pages 9-19, published in August 1995. The tread material rubs over a surface, such as a Norton Vulcan A30S-BF42 disc. The linear speed during contact is 70 m/s with a mean contact pressure of 15 to 20 bar. The device is designed to rub until exhausting of the energy from 10 to 20 $MJ/m^2$ of contact surface. The loss in weight performance is evaluated on the basis of the loss in weight according to the following formula: Loss in weight performance=loss in weight control/loss in weight sample. The results are expressed in base 100. A loss in weight performance for the sample of greater than 100 is regarded as better than the control.

Table I below describes a rubber composition T1 of the prior art, used as reference, and a rubber composition C1 according to the invention. The rubber composition T1 comprises 100 phr of natural rubber: it is a composition based on natural rubber, commonly used by those skilled in the art to manufacture an aeroplane tire tread. The rubber composition C1 comprises 100 phr of a diene elastomer E1 comprising, in accordance with the invention, ethylene units and diene units comprising a carbon-carbon double bond, which units are distributed randomly within the first diene elastomer, the ethylene units representing at least 50 mol % of all the monomer units of the first diene elastomer. This diene elastomer E1 is a copolymer comprising units UA, UB, UC, UD at molar percentages as defined by table II below: 71% of subunit UA, 8% of subunit UB, 14% of subunit UC and 7% of subunit UD.

TABLE I

|  | Composition | |
| --- | --- | --- |
|  | T1 | C1 |
| NR (1) | 100 | — |
| Elastomer E1 | — | 100 |
| Carbon black (2) | 30 | 30 |

TABLE I-continued

| | Composition | |
|---|---|---|
| | T1 | C1 |
| Antioxidant (3) | 1.5 | 1.5 |
| Stearic acid (4) | 2.5 | 2.5 |
| Zinc oxide (5) | 3 | 3 |
| Accelerator (6) | 2.0 | 2.0 |
| Sulfur | 0.8 | 1.5 |

(1) Natural rubber
(2) N234 according to Standard ASTM D-1765
(3) N-(1,3-Dimethylbutyl)-N-phenyl-para-phenylenediamine, Santoflex 6-PPD from Flexsys
(4) Stearin, Pristerene 4931 from Uniqema
(5) Zinc oxide of industrial grade from Umicore
(6) N-Cyclohexyl-2-benzothiazolesulfenamide, Santocure CBS from Flexsys

TABLE II

| Subunit UA | 71 |
|---|---|
| Subunit UB | 8 |
| Subunit UC | 14 |
| Subunit UD | 7 |

Table III below presents the loss in weight performance of the rubber compositions T1 and C1, respectively, following laboratory abrasion tests on a high-speed abrasion tester, as described above. The loss in weight performance of the rubber composition C1 is virtually double (180%) that of the rubber composition T1.

TABLE III

| | Composition | |
|---|---|---|
| | T1 | C1 |
| Loss in weight performance (%) | 100 | 180 |

Consequently, an aeroplane tire, the tread of which comprises, in the middle part, a rubber composition C1, will have better resistance to touch wear and may, at an equivalent rate of wear, perform a greater number of landings than an aeroplane tire, the tread of which comprises, in the middle part, a composition T1 based on natural rubber.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An aeroplane tire, comprising a tread having an axial width L, the tread comprising:
    a middle part having an axial width $L_C$ at least equal to 50% and at most equal to 80% of the axial width L of the tread and composed of a middle rubber composition, and
    two lateral parts positioned axially on either side of the middle part, each having an axial width at least equal to 10% and at most equal to 25% of the axial width L of the tread and each composed of a lateral rubber composition,
    wherein the middle rubber composition comprises at least 50 phr of a first diene elastomer, a reinforcing filler and a crosslinking system, which first diene elastomer comprises ethylene units and diene units comprising a carbon-carbon double bond, which units are distributed randomly within the first diene elastomer, the ethylene units representing at least 50 mol % of all the monomer units of the first diene elastomer,
    wherein the tire comprising a crown reinforcement radially inside the tread, wherein the tire comprises an interlayer composed of at least one rubber composition, in contact by a radially outer face with at least the middle part of the tread and by a radially inner face with the crown reinforcement,
    wherein the interlayer is composed of an elastomeric laminate comprising, radially from the outside to the inside, n layers Ci, n being an integer greater than or equal to 2 and i being an integer ranging from 1 to n, each composed of a diene rubber composition, the layer C1 comprising a diene elastomer E comprising ethylene units and diene units, the diene units representing more than 10% by weight of the monomer units of the diene elastomer E, the layer Cn comprising from 50 to less than 100 phr of a diene elastomer N having a content by weight of diene units of greater than 50%, the content expressed in phr of diene elastomer N being higher in the layer Cn than in the layer C1, the content expressed in phr of the diene elastomer E being higher in the layer C1 than in the layer Cn, the layers Ci, for the values of i ranging from 2 to n−1, where n is greater than 2, comprising a diene elastomer I selected from the group consisting of diene homopolymers and copolymers having more than 10% by weight of diene units.

2. The tire according to claim 1, wherein the middle rubber composition comprises at least 60 phr of the first diene elastomer.

3. The tire according to claim 1, wherein the first diene elastomer is a copolymer comprising ethylene units, butadiene units, and units of cyclical structure selected from the subunits of formula UD and of formula UE,

UD

UE

4. The tire according to claim 1, wherein the first diene elastomer is a copolymer comprising the following units UA, UB, UC, UD, UE and UF, distributed randomly within the copolymer chain,

UA)

—CH$_2$—CH$_2$— according to a molar percentage of m %

UB)

—CH$_2$R$_1$C=CR$_2$—CH$_2$— according to a molar percentage of n %

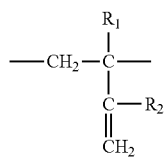

according to a molar percentage of o %

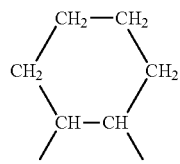

according to a molar percentage of p %

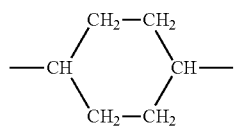

according to a molar percentage of q %

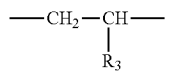

according to a molar percentage of r %

$R_1$ and $R_2$, which are identical or different, denoting a hydrogen atom, a methyl radical or a phenyl radical which is unsubstituted or substituted in the ortho, meta or para position by a methyl radical, $R_3$ denoting an alkyl radical having from 1 to 4 carbon atoms or an aryl radical, m, n, o, p, q and r being numbers ranging from 0 to 100, $m \geq 50$
$0 < o+p \leq 25$
$o+p+q \geq 10$
$n+o > 0$
$q \geq 0$
$0 \leq r \leq 25$ the respective molar percentages of m, n, o, p, q and r being calculated on the basis of the sum of m+n+o+p+q+r, which is equal to 100.

5. The tire according to claim 4, wherein r is equal to 0.
6. The tire according to claim 4, wherein at least one of the two molar percentages p and q is different from 0.
7. The tire according to claim 4, wherein p is strictly greater than 0.
8. The tire according to claim 4, wherein the first diene elastomer meets at least one of the following criteria:
$m \geq 65$
$n+o+p+q \geq 15$
$10 \geq p+q \geq 2$
$1 \geq n/(o+p+q)$
when q is non-zero, $20 \geq p/q \geq 1$.
9. The tire according to claim 4, wherein the first diene elastomer contains, as monomer units, solely the units UA, UB, UC, UD and UE according to their respective molar percentages m, n, o, p and q.
10. The tire according to claim 4, wherein the first diene elastomer contains, as monomer units, solely the units UA, UB, UC and UD according to their respective molar percentages m, n, o, and p.
11. The tire according to claim 4, wherein $R_1$ and $R_2$ are identical and denote a hydrogen atom.
12. The tire according to claim 1, wherein the first diene elastomer is the only elastomer of the middle rubber composition.
13. The tire according to claim 1, wherein the middle rubber composition comprises a second elastomer.
14. The tire according to claim 13, wherein the second elastomer is a highly unsaturated diene elastomer selected from the group consisting of polybutadienes, polyisoprenes, butadiene copolymers, isoprene copolymers and the mixtures of these elastomers.
15. The tire according to claim 13, wherein the second elastomer is a ternary copolymer obtained by copolymerization of ethylene and of an α-olefin having from 3 to 6 carbon atoms with a non-conjugated diene monomer having from 6 to 12 carbon atoms.
16. The tire according to claim 1, wherein the content of reinforcing filler of the middle rubber composition is at least equal to 20 phr and at most equal to 70 phr.
17. The tire according to claim 1, wherein the middle rubber composition comprises 0 to 20 phr of a liquid plasticizer.
18. The tire according to claim 17, wherein the content of liquid plasticizer of the middle rubber composition is equal to 0.
19. The tire according to claim 1, wherein at least one lateral rubber composition is different from the middle rubber composition.
20. The tire according to claim 1, wherein at least one lateral rubber composition comprises a diene elastomer, a reinforcing filler and a crosslinking system, which diene elastomer is a highly unsaturated diene elastomer selected from the group consisting of polybutadienes, polyisoprenes, butadiene copolymers, isoprene copolymers and mixtures of these elastomers.
21. The tire according to claim 1, wherein at least one lateral rubber composition comprises at most 50 phr of the first diene elastomer.
22. The tire according to claim 1, wherein the two lateral parts, positioned axially on either side of the middle part, have identical axial widths ($L_{S1}$, $L_{S2}$) and are composed of identical lateral rubber compositions.

* * * * *